United States Patent
Sabnis

[11] 3,976,339
[45] Aug. 24, 1976

[54] MAGNETIC SUSPENSION APPARATUS
[75] Inventor: Ajit V. Sabnis, Phoenix, Ariz.
[73] Assignee: Sperry Rand Corporation, New York, N.Y.
[22] Filed: Jan. 14, 1974
[21] Appl. No.: 433,430

[52] U.S. Cl. ................................................ 308/10
[51] Int. Cl.² ......................................... F16C 39/00
[58] Field of Search ....................................... 308/10

[56] References Cited
UNITED STATES PATENTS

| | | | |
|---|---|---|---|
| 3,238,788 | 3/1966 | Arthur | 308/10 |
| 3,383,141 | 5/1968 | De Bennetot | 308/10 |
| 3,428,371 | 2/1969 | Lyman | 308/10 |
| 3,473,852 | 10/1969 | Lyman | 308/10 |
| 3,493,275 | 2/1970 | Stone | 308/10 |
| 3,650,581 | 3/1972 | Boden | 308/10 |
| 3,779,618 | 12/1973 | Soglia | 308/10 |
| 3,787,100 | 1/1974 | Habermann | 308/10 |

OTHER PUBLICATIONS
P. A. Studer; "Magnetic Bearings for Spacecraft"; Jan. 1972; pp. 1–6; Goddard S.C.; Greenbelt, Md.

*Primary Examiner*—R. Skudy
*Attorney, Agent, or Firm*—Howard P. Terry

[57] ABSTRACT

A magnetic bearing assembly for levitating a movable member in either rotation or linear translation comprises a three-loop magnetic circuit in which permanent magnets establish a quiescent or fixed flux across four magnetic gaps arranged to provide restoring forces transverse to the direction of gap flux; the resulting inherent instability in the longitudinal direction is overcome by an electric feedback control system which supplies control currents in a pair of coils associated with the magnetic gaps for modulating the permanent magnetic flux therein and thereby provides stabilizing longitudinal magnetic forces. The configuration may be generalized by simple extension to a (2n + 1) loop magnetic circuit with (n + 1) coils.

3 Claims, 7 Drawing Figures

MAGNETIC SUSPENSION APPARATUS

CROSS REFERENCE TO RELATED APPLICATION

The present invention is related to copending application Ser. No. 433,431 filed concurrently herewith on Jan. 14, 1974 and entitled "Magnetic Suspension Apparatus with Magnetic Stiffness Augmentation" in the name of the present inventor and James R. Dohogne and assigned to the Sperry Rand Corporation.

BACKGROUND OF THE INVENTION

1. Field of the Invention

The present invention relates generally to magnetic suspensions or levitations for movable members, movable in rotation about an axis or in extended linear translation. More particularly, the invention pertains to a novel magnetic and electromagnetic core, coil and electronic circuit configuration adaptable to rotational applications such as for suspending the spin axis of the rotor and gimbal axes of gyroscopic devices, or to translational applications such as for freely suspending vehicles relative to a track in mass transit systems.

2. Description of the Prior Art

Magnetic suspensions have been proposed and used extensively in the past for substantially frictionlessly suspending of a movable member, but in most cases the suspended member was of very low mass and moment of inertia, such as for example for suspending the rotor of a watt/hour meter, for suspending very light, hollow shell-like gyro rotors, or for assisting in the suspension of heavier objects such as fluid floated gyroscopes.

More recently, considerable investigative work has been done in developing magnetic bearing suspensions for much heavier objects, particularly in rotary applications such as in centrifuges and large gyroscopic rotors. Examples of the latter are disclosed in U.S. Pat. Nos. 3,428,371 and 3,473,852. More specifically, improvements in magnetic suspensions of the general type shown in these patents have been suggested, reference being particularly directed to the work of P. A. Studer as described by him in the NASA Goddard Space Flight Center report identified as NASA-TM-X-6611, dated January 1972, and entitled "Magnetic Bearings for Spacecraft". The present invention constitutes a significant improvement of the magnetic bearing disclosed in this report.

In general, and considering for this discussion the rotational application, the entire load of the suspended member is carried by magnetic fields across small gaps between the member and the fixed support member. In the case of spindle support, these gaps are arranged symmetrically at either end of the spindle supporting the rotating mass. The gaps may be configured such that radial loads are supported by the quiescent or fixed flux of a permanent magnet across the gap, and which may be referred to herein as a passive loop system, i.e., the tendency of attractive poles to align themselves to seek the minimum reluctance or maximum co-energy position, and the inherent instability of the attractive flux in the axial direction is overcome by a variable flux field, either across the same gap or further independent gaps, produced by electromagnetic means such as coils driven by a closed loop servo system responsive to the movement (position, rate, acceleration, or combinations thereof) between the supported and fixed members, and which may be referred to herein as an active loop. In some configurations, both the radial support flux and axial support flux across the same gaps are provided only by electromagnets as shown in the above-mentioned U.S. Pat. No. 3,473,852, while the above-mentioned U. S. Pat. No. 3,428,371 is illustrative of an axially/passive, radially/active configuration using separate gaps for each.

Studer discloses a radially passive/axially active configuration in which the permanent magnet flux is directed across circular axial gaps between soft iron cylindrical members to produce inherent radial stiffness while the electromagnetic coils of the axially active loop serve to produce a flux which modulates the permanent magnet flux. More specifically, and considering only one bearing assembly at one end of a support spindle or shaft, the Studer configuration comprises four axial gaps and three flux loops conducted by soft iron cylindrical members characterized by the fact that the active or modulating flux does not have to counter the reluctance of the permanent magnet, but rather has a preferred low-reluctance path through soft iron. The disadvantage of the Studer configuration, however, resides in the fact that two permanent magnets are required for the passive radial support and one common coil for the active axial support and that with this configuration only the flux in two of the four gaps is modulated, thereby reducing efficiency. Furthermore, the radial stiffness is fixed or uncontrollable. Also, the coil and magnets are not supported on a common element; one is mounted on the suspended element while the other is on the fixed element, or vice versa, thus adding mass to the supported element and/or requiring some kind of current conductor to the rotating member.

SUMMARY OF THE INVENTION

As stated above, the present invention constitutes a significant inprovement over the Studer configurtion, which improvement provides over-all design flexibility, improved efficiency, controllable radial as well as axial stiffness, capability of redundant, fail-operative operation, and reduced cost.

These advantages are achieved by changing the magnet/coil arrangement such that the four gap/three flux loop system is maintained but in which the flux density of all four gaps is electrically modulated. Thus, in the configuration of the present invention but a single magnetic means is used to energize all of the gaps and an additional coil means is supplied, both magnet and coils being mounted on a common mechanical structure, either the moving structure or the fixed structure. Preferably, in a high speed rotating system, the magnet and coils are fixed to avoid transferring current between relatively moving parts and to avoid possible fracture of the limited mechanical strength of most magnet materials.

Generally, a first soft iron member of the magnetic bearing is configured, in cross-section, in the general shape of a flat bottomed W with cooperating relatively fixed or mechanically common second and third soft iron members supported between the open arms of the W to thereby define three flux paths having four successive, generally collinear (or parallel) flux gaps $G_1$, $G_2$, $G_3$ and $G_4$ for conducting magnetic flux parallel to the support axis. The first member may be movable longitudinally and transversely relative to the second and third members or vice versa. A permanent magnet is connected between the second and third members to thereby produce a quiescent magnetic flux in opposite directions (or of opposite polarity) through gaps $G_1$ and $G_2$ and through gaps $G_3$ and $G_4$. This quiescent flux serves to produce a restoring force to any relative transverse movement between the first member and the second and third members. Also supported by the second and third members and respectively in the two spaces defined by the soft iron members are two coils which, when excited in accordance with relative longitudinal movement of the members, produce an electromagnetic flux across all gaps $G_1$, $G_2$, $G_3$ and $G_4$ which modulates the magnet flux such that the unstable longitudinal force produced by the latter is overcome and the movable member is maintained at a longitudinally fixed position; i.e., with the gap space constant.

In the preferred rotary bearing configuration, the first soft iron member may be a figure of revolution of the above cross-section with the annular flattened base of the W supported on a rotary shaft to be supported and with the second and third annular members supporting the magnet and coils fixed. With the linear levitation configuration, the flattened base of the W may be one or more elongated "rails" with the second and third members carrying the magnet and coils mounted on a vehicle to be magnetically levitated.

The magnetic bearing of the present invention provides substantial advantages over the above-described prior art. For example, with the rotary configuration which normally will include two magnetic bearings, one on each end of the supported shaft, the dual coil arrangement provides for dual channel, fail operational operation; that is, a single channel failure will not cause bearing touch down. Also, with the present magnetic configuration, by reversing the sense of the current supplied to one of the windings of the dual windings, the translational or radial restoring force of the magnet may be augmented whereby, due to the spring characteristics of the restoring magnetic force, resonant vibrations occurring at predetermined speeds during run up and run down may be suppressed. This is accomplished by driving equal and opposite currents in the two windings to thereby increase the radial restoring force or stiffness. Thus, by suitably switching from the augmented stiffness condition to normal stiffness during spin up and spin down, either manually, or automatically as a function of rotor speed (or incipient resonance), all resonant speeds are in effect by-passed and not actually encountered.

A further feature of the present magnetic bearing configuration is the provision of radial or translational stiffness damping. It is known to the prior art to increase this stiffness by providing a plurality of lands and grooves on the pole piece faces; i.e., flux concentrators. In the rotary application of the present invention (also applicable, of course, to the linear levitation application), concentric grooves are machined in the pole faces to form a plurality of concentric rings. Inherently, however, the quiescent magnetic flux provides only very little mechanical damping in the radial direction due to electromagnetic losses in the pole piece material. This inherent damping is usually insufficient and must be augmented to sufficiently reduce vibration resonant amplitudes and provide desirable dynamic operation characteristics. It is known to the prior art of magnetic bearings to provide fixed circular copper plates adjacent flat circular magnet poles to provide eddy current damping upon movement of the magnet laterally across the plate. However, the configuration is not efficient since the magnetic circuit is not closed and, more significantly, flux change occurs only at the periphery of the copper disk uncovered by the magnet force. The configuration of the present invention is more effective and efficient and mechanically achievable without additional over-all dimension change. This configuration comprises the simple addition of relatively heavy gauge copper wire loops laid in the grooves of the pole faces and cemented in place. Thus, with this unique arrangement, the same magnetic gap fields are used for support and for damping, the damping being very efficient due to the plurality of flux concentrating rings and closed magnetic paths.

Some of the principal advantages and features of the magnetic bearing of the present invention may be summarized as follows:

Both the magnets and coils are supported on a fixed structure;

The coil currents providing axial stability do not counter the reluctance of the magnet but only the reluctances of the air gap;

The axial stiffness obtainable is proportional to the quiescent bias field and hence permits high gain at low power levels;

Electrical radial stiffness augmentation is possible;

Eddy current damping is incorporated in the system.

Other features and advantages of the magnetic bearing of the present invention will become apparent in the following detailed description of preferred embodiments thereof illustrated in the accompanying drawings.

DESCRIPTION OF THE PREFERRED EMBODIMENTS

Figure 1:
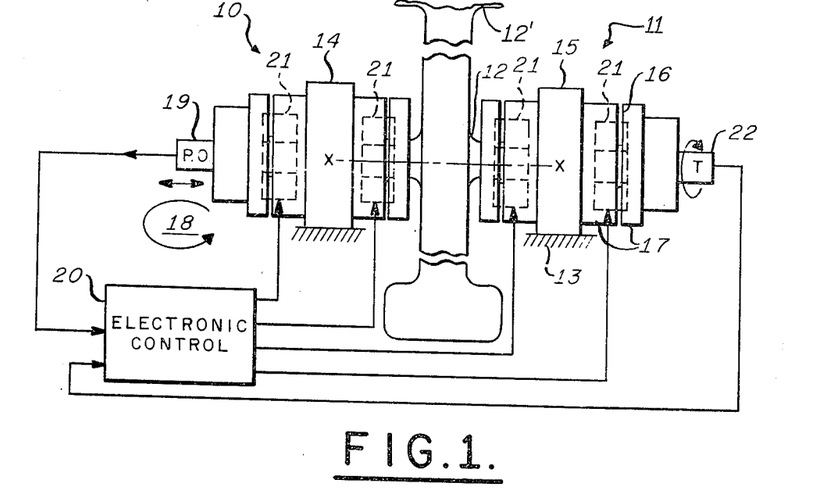
FIG. 1 is a system drawing of a flywheel or gyroscope rotor supported by a pair of spaced rotary magnetic bearings incorporating the teachings of the present invention.

Referring first to FIG. 1, a pair of magnetic bearing assemblies 10 and 11 is shown as supporting a flywheel on an axle, such as for example a gyroscopic rotor 12' on an axle or support shaft 12, in a vehicle 13 such as for example an aircraft or spacecraft, for high speed rotation about a longitudinal or spin axis X—X. The motor for spinning the rotor 12' has not been illustrated, to clarify the disclosure. Each magnetic bearing assembly 10, 11 is of the radially passive, axially active type in which annularly arranged permanent magnets 14 and 15 of high energy product (such as Alnico 9 or more preferably one of the more recent rare earth types such as samarium-cobalt which has a recoil permeability around unity for efficient, high energy magnetic circuit applications) provide a quiescent magnetic flux across a plurality of axially directed gaps 16 between the movable and fixed element of the bearing, only four of which are visible in FIG. 1, in a soft iron magnetic circuit shown generally at 17 and which will be described in detail below. Thus, the magnet flux across the axial gaps 16 produces a restoring force tending to maintain the axis of shaft 12 radially coincident with bearing axis X. This quiescent flux will therefore inherently cause the gaps to close toward one side or the other and lock the relatively movable members together. In order to stabilize this inherently unstable situation, an active closed loop servo system 18 is used. Thus, movement of the movable member in an axial direction is detected, as by a precise proximity pick-off device 19 such as a conventional eddy-current pick-off, the signal output of which is proportional in magnitude and sense to any change in the gap length from some predetermined value, this signal being processed and amplified as at 20 and a proportional current applied to a plurality of electrical coils 21 to produce in the magnetic circuit an electromagnetic flux which modulates the permanent magnet flux in a manner to arrest any change in gap length; i.e., to reduce the signal from pick-off or sensor 19 to zero. In order to provide the automatic radial force augmentation feature, the rotational velocity of rotor 12' is detected by a tachometric device 22, the output of which is supplied to the electronic control 20 for switching purposes, as will be described fully below.

Figure 2:
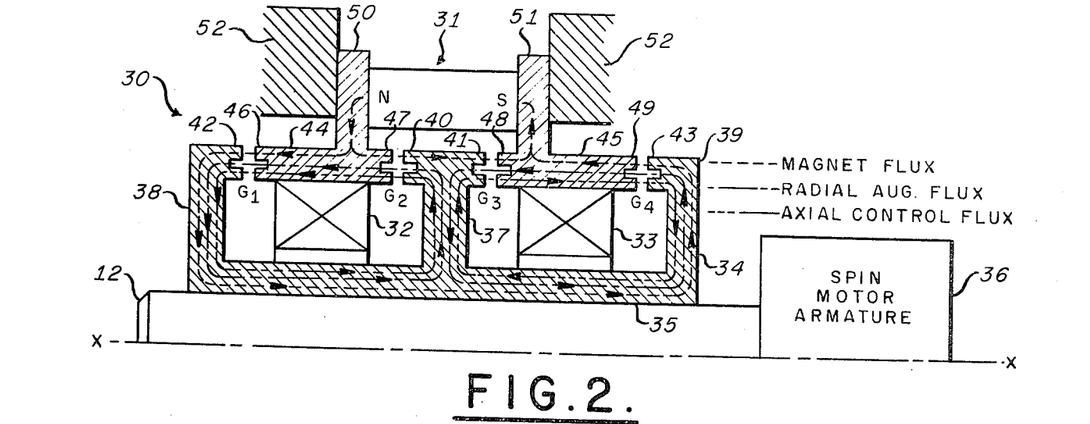
FIG. 2 is a somewhat schematic cross-sectional representation of one of the magnetic bearings of FIG. 1 showing the magnet/coil/core/gap arrangement of the present invention.

Referring now to FIG. 2, there is illustrated in schematic, partial longitudinal cross-section, one of the magnetic bearings 10 or 11 of FIG. 1, the complete bearing constituting a figure of revolution of this cross-section about the longitudinal axis X—X. The basic elements of the bearing structure comprise a three-loop, four-gap soft iron magnetic flux circuit 30, a permanent magnet 31 and a pair of electrical coils 32 and 33. The soft iron circuit comprises a first core member 34 which in cross-section is in the shape of an elongated, flat bottomed W having a base portion 35 supported in this embodiment, on the shaft 12 of the rotor 12'. The rotor spin motor armature is indicated schematically at 36. The base portion 35 has a central portion 37 and end portions 38 and 39, each of these portions terminating in axially extending short pole pieces 40, 41 and 42 and 43, respectively. Axially extending second and third core members 44 and 45 of the soft iron flux circuit are positioned between the open ends of the W-shaped first core member 34, that is, between the pole pieces 40 and 42 and 41 and 43, and each of these members terminates in pole pieces 46, 47 and 48, 49, respectively. The second and third core members 44 and 45 are provided with annular flanges 50 and 51, respectively, between which is located an annular magnet member 32. This magnet may be an integral cylindrical magnet or may comprise a number of smaller magnets distributed about the bearing periphery and between the flanges 50, 51. The pole members 44, 45, flanges 50, 51 and magnet 31 are all rotationally fixed on a base support 52. The magnet(s) 31 is polarized axially as shown so that the quiescent flux from the north pole, indicated by arrowed, dashed lines, threads through a first loop as follows: to the left across gap $G_1$, down through the flange or end wall 38, to the right along base 35, upwardly through flange or end wall 39, to the left across gap $G_4$ and thence back to the south pole of the magnet 31. Additionally, the flux from the north pole of magnet 31 threads through a second loop: to the right across gap $G_2$, across gap $G_3$ and back to the magnet south pole. Supported on fixed members 44 and 45 is the pair of identical annular windings 32 and 33, respectively, which when energized in a predetermined fashion as described in detail below provide controllable fluxes primarily through an electromagnetic loop or loops comprising gap $G_1$, end wall 38, base 35, central wall 37, and gap $G_2$ and through gap $G_4$, end wall 39, base 35, central wall 37, and gap $G_3$. The magnetic bearing configuration of FIG. 2 is, in analysis, a three-loop system and provides passive radial suspension and active axial suspension and permits radial suspension augmentation, as will be described.

The radial restoring force is due to the inherent tendency of the poles to seek the minimum reluctance, or maximum co-energy, position. The annular permament magnet 31 establishes a quiescent flux across cylindrical gaps $G_1$, $G_2$, $G_3$ and $G_4$ to provide the required radial stiffness. Conformal transformations indicate that the critical radial stiffness $K_r$ in the radially centered position is given by:

$$K_r \big|_{r=0} = \frac{nr' B_o^2}{\mu_0} \qquad (1)$$

wherein:
$n$ = total number of ring pairs (defining the gaps)
$r'$ = mean radius of the rings
$B_o$ = flux density across the gaps
$\mu_0$ = permeability in the gaps This radially passive restoring system is accompanied by an inherent instability in the axial direction. In the configuration illustrated in FIG. 2, this axial instability is at least twice the magnitude of the restoring radial stiffness since only ferromagnetic materials are involved. Thus, letting $K_x$ represent the axial unstable stiffness and $K_r$ the stable radial stiffness:

$$|K_x| \geq 2|K_r| \qquad (2)$$

The magnetic material for the magnet 31 may be selected from a number of available materials. However, such material should be selected based on the following desirable characteristics for the larger gaps associated with magnetic bearings: high energy in the magnetic circuit for maximum efficiency (a B/H near unity), a high BH characteristic (high energy product), a high resistance to demagnetization, and no requirement for keepers. Samarium-cobalt magnets have been found to be very suitable for the present preferred embodiments of the present invention.

In order to obtain stable support in the axial direction it is necessary to use time-varying magnetic fields. These are provided by the coils or windings 32 and 33, the position transducer 19, and electronic control 20 which together form the closed-loop system 18. This feedback control of the currents in the coils 32, 33 produces electromagnetic fluxes in the gaps $G_1$, $G_2$, $G_3$ and $G_4$ which modulate the quiescent magnetic fluxes therein produced by magnet 31 thereby enabling axial forces to be developed between the fixed and rotating or suspended elements of the bearing. In general, the coil currents function to increase the flux in the widening gap and decrease it in the narrowing gap. These fluxes may be evaluated by referring to FIG. 2.

Let $B_0$ be the quiescent flux density of magnet 31 across each gap $G_1$, $G_2$, $G_3$, and $G_4$ in the direction of the dashed flux lines in FIG. 2, and let $\Delta B$ be the change in flux density across these gaps due to currents in the coils 32, 33, in the directions of the triple-dot-dash flux lines of FIG. 2, and let A be the total effective pole face area. Thus, the modulated flux densities in the gaps are as follows:

$G_1$ flux density is $B_0 + \Delta B$
$G_2$ flux density is $B_0 - \Delta B$
$G_3$ flux density is $B_0 + \Delta B$
$G_4$ flux density is $B_0 - \Delta B$ It may therefore be shown that the resultant axial force $F_a$ is proportional to the following expression:

$$F_a \propto \frac{A}{\mu_0}[2(B_0 + \Delta B)^2 - 2(B_0 - \Delta B)^2] \quad (3)$$

or:

$$F_a \propto \frac{4A}{\mu_0} B_0 \Delta B \quad (4)$$

This force relationship demonstrates (1) that since $\Delta B$ is proportional to the currents in coils 32, 33, bidirectional axial forces may be generated by reversing current direction in the coils; (2) that the force per ampere is directly proportional to the quiescent flux density $B_0$; (3) that the feedback controlled coil current can be made to be a function of a combination of sensor inputs, e.g. axial position $x$ of the rotor relative to the support from equilibrium position, axial velocity $\dot{x}$ of the rotor relative to the support from equilibrium position, and axial acceleration $\ddot{x}$ of the rotor relative to the support from equilibrium position, and gap flux density. Thus, the axial dynamics of the magnetic bearing of FIGS. 1 and 2 may be represented in linearized form by the general expression:

$$M\ddot{x} + b\dot{x} - K_u x = F_a \quad (5)$$

where:
$x =$ the displacement of the rotor from equilibrium position,
$M =$ the suspended mass,
$b =$ the inherent damping (which is extremely small),
$K_u =$ the axial unbalance stiffness, and
$F_a =$ the external axial force.

Without some form of feedback, the system defined by equation (5) is clearly unstable. However, if a force due to a negative feedback term is supplied by coils 32, 33 and properly applied in the system of equation (5), the system may be made stable. Several types of feedback are possible; e.g. (a) acceleration-rate feedback and (b) rate-displacement feedback. While both feedback types are included within the scope of the present invention in its broader aspects, the preferred embodiment of the invention implements the latter since the former is complicated by the requirement for some form of start-up system. Of course, an advantage of the former system is that there is no power loss under steady load.

In the rate-displacement feedback technique, the system described in equation (5) above is made stable by supplying a feedback term, $F_{em}$, proportional to axial position and velocity:

$$F_{em} = -K_R \dot{x} - K_D x \quad (6)$$

where:
$K_R =$ velocity gain constant, and
$K_D =$ displacement gain constant.

Inserting this feedback term in the system represented by equation (5) there results:

$$M\ddot{x} + K_R \dot{x} + (K_D - K_u) x = F_{disturbance} \quad (7)$$

which defines a system with a static stiffness of $(K_D - K_u)$, an inherent stability for $K_D > K_u$, and a power loss; i.e., steady state currents are required under steady state external loads.

Thus, by controlling the currents in the coils 32 and 33 of FIG. 2 in accordance with the control law of equation (7), the magnetic fluxes in the gaps $G_1$, $G_2$, $G_3$, and $G_4$ will be varied in a manner to maintain the magnetic axial suspension of the rotor 12' under dynamic and static loading while the passive radial magnetic forces maintain the rotor suspended under radial loading. The electronic controls for the axial suspension system are shown in schematic form in FIG. 4. However, before proceeding with a discussion of this electronic control, a typical mechanical embodiment of the present invention will be described, reference being made to FIG. 3.

Figures 3, 6:
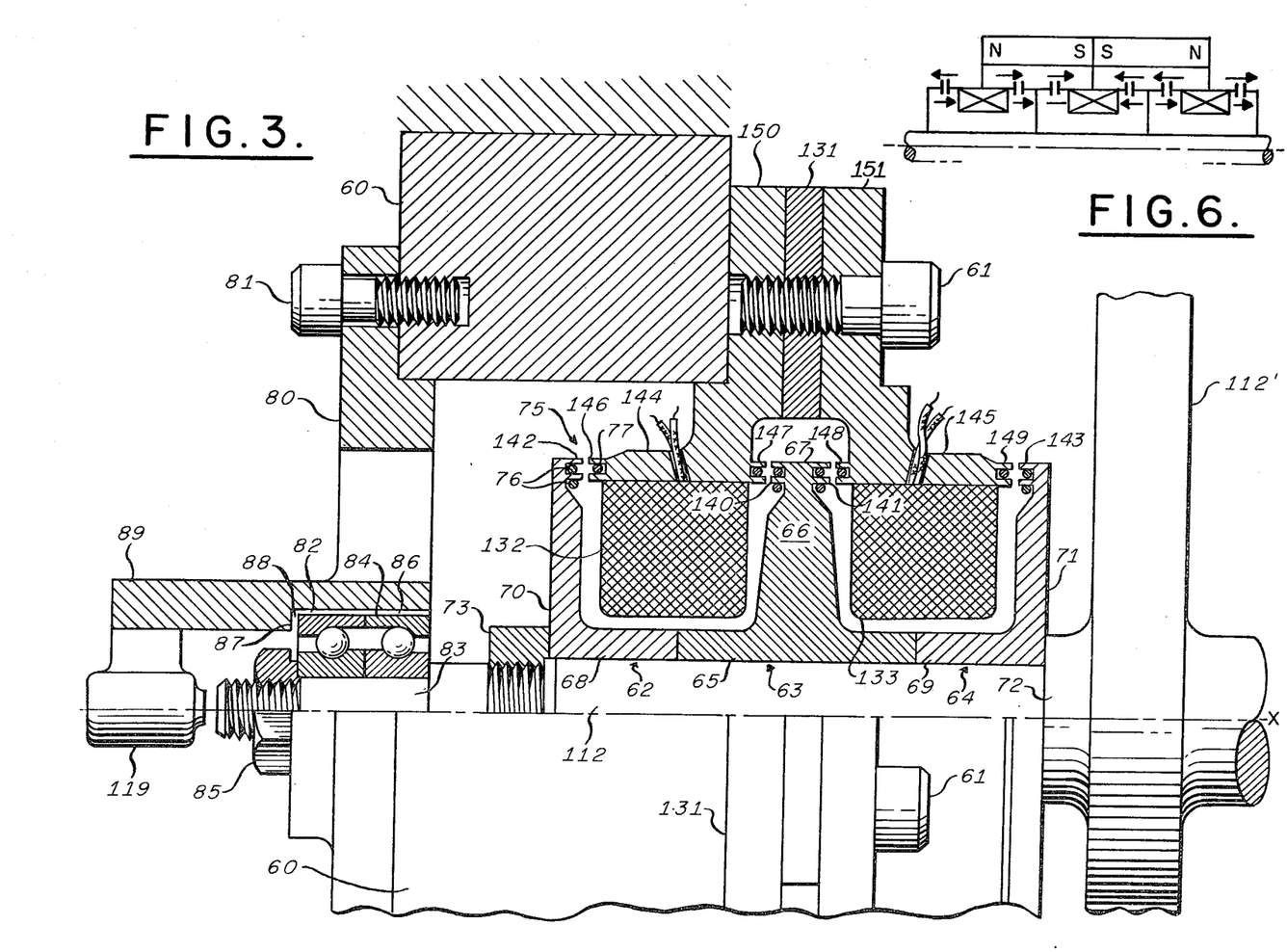
FIG. 3 is a partial sectional view of one particular embodiment of the magnetic bearing configuration of the present invention.
FIg. 6 is a schematic illustration of a modification of the core/magnet/coil arrangement of the present invention.

FIG. 3 is a half cross-section, half elevation view of one of two identical magnetic bearings for supporting the rotor of a gyroscope and embodying the teachings of the present invention. The main stator support comprises a ring (or housing or rotor case) member 60 of suitable non-magnetic material such as aluminum rigidly secured to, for example, a vehicle to be stabilized by the gyroscope. The generally radially extending stator flanges 50 and 51 of FIG. 2, represented at 150 and 151 of FIG. 3, are fabricated of magnetically permeable material such as soft iron, and are supported on housing 60 by screws (not shown). Sandwiched between flanges 150 and 151 are magnet means, shown in FIG. 3 by a plurality of disk magnets 131 distributed about the periphery of the flanges and secured therebetween by suitable means such as screws 61. For example, eight such disk magnets are satisfactory for the configuration shown and the size of the suspended rotor 112'. The magnets are preferably of samarium-cobalt and are axially polarized. Of course, a single, axially polarized ring magnet may be employed. Also, additional magnets may be employed, for example, on the outer surfaces of flanges 150,151 and so axially polarized as to increase the magnetic flux in the flanges produced by magnets 131. As in FIG. 2, the annular flanges 150 and 151 widen at their inner periphery to form a pair of axially extending cylindrical core members 144 and 145 terminating at their respective ends in pole pieces 146, 147 and 148 and 149, respectively. Rigidly secured to the internal peripheries of cylindrical core members 144 and 145, as for example by epoxy cement, are electrical coils 132 and 133, the leads thereof extending through suitable holes drilled through the core members. Thus, the magnets and coils are all carried on a fixed support.

The rotor 112' is supported on a spindle 112 which also supports the cooperating magnetically permeable core elements of the magnetic bearing. In FIG. 2, these cooperating core elements are schematically illustrated as a one-piece core member 34, while in FIG. 3, this core member is made up of three apertured flanged elements 62, 63 and 64 fabricated from suitable magnetically permeable material such as soft iron. The central core element 63 includes an elongated hub 65 supported on rotor shaft 112 and having a central annular radially extending tapered flange 66 which terminates at its periphery in a short axially extending cylindrical portion 67, the ends of which define a pair of poles 140 and 141 corresponding to poles 40 and 41 of FIG. 2. Core elements 62 and 64 are identical but mirror images and comprise elongated hubs 68, 69 supported on shaft 112 and having annular end flanges 70 and 71 which terminate at their peripheries in short axially extending cylindrical portions, the internal ends of which define pole pieces 142 and 143, respectively, corresponding to poles 42 and 43 of FIG. 2. The elements 62, 63 and 64 are assembled on shaft 112 and are secured firmly in place by means of shoulder 72 and clamping unit 73. Thus, the core elements 62, 63 and 64 all cooperate when assembled to form, in cross-section, the elongated flatbottomed W-shaped first core member of the magnetic bearing. The second and third core members lying between the open arms of the W are of course the flanged cylindrical members 144 and 145. In the preferred embodiment, the second and third core members are fixed and the fist core member is on the rotatable suspended member.

In order to substantially increase the radial stiffness of the magnetic bearing, each of the circular pole piece faces is formed, as by suitable machining, with opposed concentric rings, as shown typically at 75 in FIG. 3. While two such rings are therein illustrated for each pole face, it will be understood that a larger plurality of such flux concentration rings may be employed.

In accordance with the teachings of the present invention, passive radial damping of the rotating structure is provided. There is very little and usually insufficient inherent radial damping provided by the quiescent magnetic flux across the gaps $G_1$, $G_2$, $G_3$ and $G_4$ and it must be augmented to reduce vibration resonant amplitudes and provide desirable dynamic operational characteristics, particularly in environments encountered in gyro stabilization applications. This passive radial damping is provided by laying closed loops 76, 77 (typically) of heavy gauge copper wire in the grooves of the pole faces formed by the pole face rings 75 whereby, upon relative radial movement between the pole faces, eddy currents are generated in the copper wire loop, which currents react with the gap flux to produce radial forces which oppose such movement and hence damp such movements. This damping configuration is very effective and highly efficient and is accomplished with no dimensional change in the magnetic circuit.

Supported on the base ring 60 is an end plate 80 secured thereto as by screws 81. This end plate may be referred to as the touch down plate for reasons to become apparent. In many applications of magnetic bearings, particularly in gyroscopic applications, it is very important to provide back-up mechanical bearing means in case of failure to the magnetic bearings or in case of severe shock loads imposed upon the magnetically suspended member. As shown in FIG. 3, the touch down plate 80 has a central axial bore 82 concentric with the spin axis X—X of the rotor 112' and spindle 112. An extension 83 of the axle or spindle 112 carries a duplex ball bearing assembly 84, the inner race of which is clamped to extension 83 as by nut 85. The axial bore 82 has a diameter larger than the outer diameter of the bearing outer race to thereby define a radial space or clearance 86 so that there is no mechanical contact between the ball bearing race and the touch down plate bore 82 during normal magnetic bearing suspension. Further, the plate 80 includes a shoulder 87 at the outer end of bore 82 defining an axial stop for the bearing outer race. However, the axial length of the bore 82 to shoulder 87 is such that there is a gap or clearance 88 which provides contactless axial movement of the spindle during normal magnetic bearing suspension. Thus, should the magnetic bearing fail for any reason, the rotating mass will be supported by the conventional duplex ball bearings. It will be noted that the back-up bearings are fixed to the rotating elment or member in the illustrated gyroscopic embodiment of the invention. This arrangement assures that, upon failure of the magnetic bearing, the spin axis will remain unchanged although its orientation will change with a radial offset at the time of touch down. This is desirable in spacecraft stabilization systems to minimize rotor/spacecraft interactions at touch down and during the time period required to activate redundant magnetic bearing suspension electronic controls which would normally be provided in such applications. It is, of course, possible to have the back-up bearing outer race fixed and the clearance provided between the inner race diameter and the spindle 112.

Also supported on the touch down plate 80 is an axial position transducer 119 corresponding to the transducer 19 of FIG. 1. This transducer may be an eddy current type of proximity gauge of conventional form which will be called hereinafter a proximiter. The transducer may be supported on an arm 89 projecting from plate 80 and so located that the transducer cooperates with the end of the shaft extension 83 to provide an electrical signal proportional to the axial movement of the shaft 112. Thus, the transducer signal is proportional to any change of axial length of the magnetic bearing gaps and this signal is used to control the currents in coils 132 and 133 as described above and as will be further described below. It will be understood, of course, that the transducer 119 may be placed at any convenient location on the fixed structure such that it can cooperate with the movable structure and provide a signal proportional to any axial relative movement between the magnetic bearing gap poles.

Figures 4, 5:
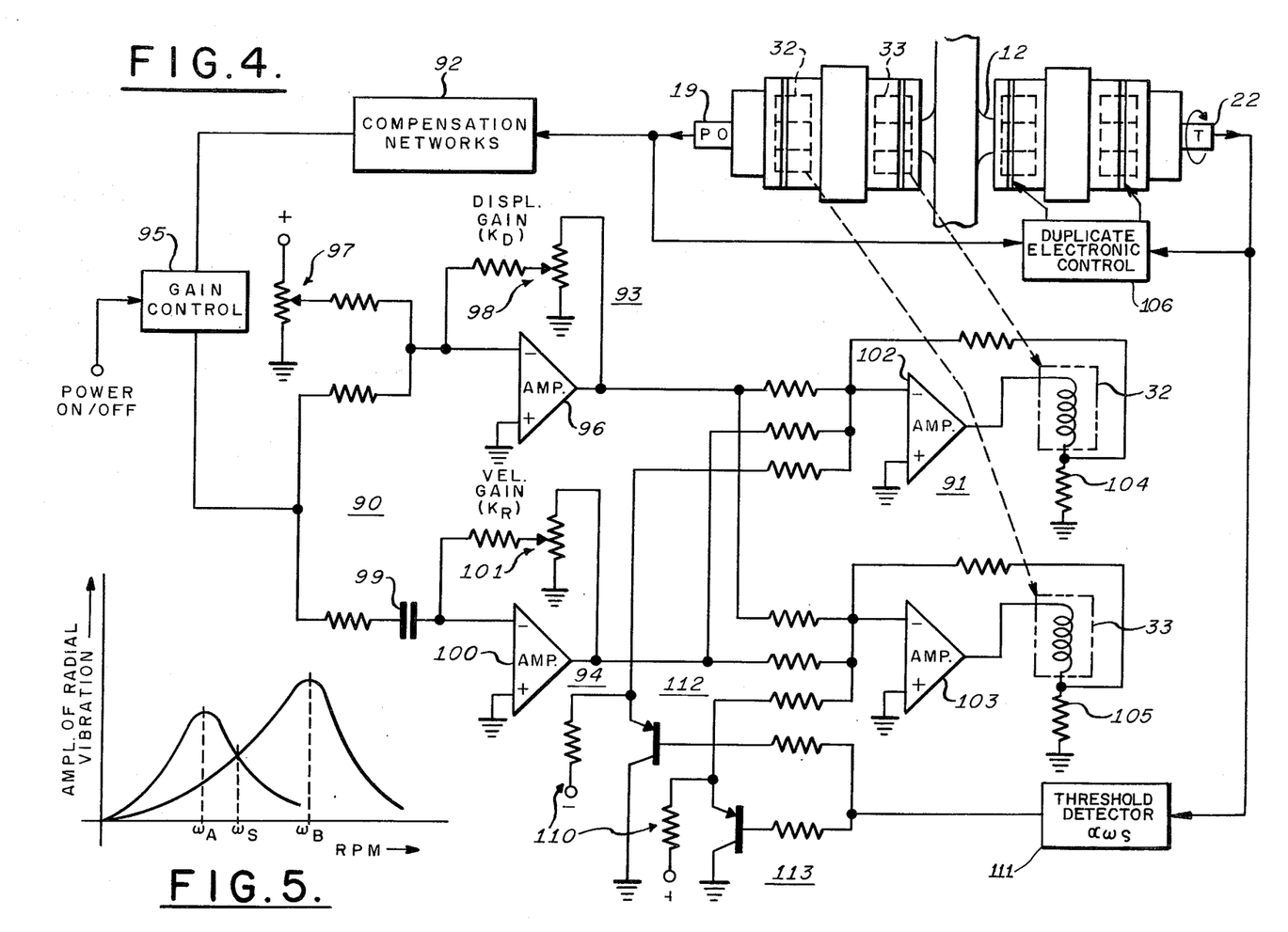
FIG. 4 is an electrical schematic of the electronic controls for the magnetic bearings including the automatic radial stiffness augmentation feature.
FIG. 5 is a typical vibration frequency diagram useful in explaining the radial stiffness augmentation feature.

Referring now to FIG. 4, there is shown schematically a suitable electronic system for controlling the axial position of the rotor by providing control currents to coils 32 and 33 to thereby maintain the rotor position substantially invariant under disturbing or external axial loads as defined by the system control equation (7) above. As stated above, the primary components for accomplishing this are the position sensor 19, and in the present embodiment a linear position sensor, a shaping network section 90, and a power amplifier section 91. The position signal from transducer 19 is processed through conventional compensating networks 92 to remove any high frequency noise components due to rotor rotation and any d.c. offset, these circuits including conventional noise filter and integrating networks. The position signal is then applied to rate and displacement channels 93 and 94, respectively. Desirably, a gain control network 95 may be employed which is responsive to power on/power off sequence for slowly increasing the gain to full gain upon power on to provide slow "lift off" and vice versa for slow "touch down". The displacement channel includes an operational amplifier 96 connected to receive the proximiter signal and a variable bias or centering signal from a source 97, the latter providing a means for adjusting the zero point for the axial positioning system. The displacement gain $K_D$ is adjusted by means of a conventional operational amplifier feedback adjusted by potentiometer 98. The rate term required by the control law is provided by detecting the rate of change of the proximiter signal. This is accomplished conventionally by means of capacitor 99 which blocks steady state components of the proximiter signal and passes only the changing components. The rate term is applied to operational amplifier 100, the gain $K_R$ of which may be set as by feedback potentiometer 101 connected therearound. The displacement and rate terms are combined at the inputs of a pair of identical power amplifiers 102 and 103, the outputs of which are the control currents supplied to the coils 32 and 33, respectively. In order that the currents supplied to coils 32, 33 are precisely as commanded by the inputs to the power amplifiers, the current through the coils is detected as by resistors 104, 105 and fed back to their respective amplifier inputs in a conventional fashion. A similar electronic control 106 may be provided for the magnetic bearing on the opposite end of the rotor support spindle 112. The two magnetic bearings at each end of the common support spindle 112 configuration are ideally suited to providing a dual redundant fail-operational system. A number of arrangements is possible.

The magnetic bearing configuration of the present invention may be controlled so as to provide active radial stiffness augmentation. One application of this feature is illustrated in FIGS. 4 and 5. During spin up and spin down of the rotor 12', mechanical and electrical anomalies can produce mechanical resonances at various spin frequencies, which resonances can cause large amplitude vibrations which may cause the shaft 112 to touch down on the back-up bearings, possibly causing brinelling, galling, etc., or other mechanical damage, not to mention increasing the power required to spin up the wheel. It is possible to predetermine these resonant spin frequencies in any particular rotating system and to prevent their undesired consequences by controlling the radial stiffness of the magnetic bearing during spin up.

Referring again to FIG. 2, it will be recalled that if the suspended member moved say to the left, the proximiter signal and electronic system would modulate the quiescent magnet flux such that the resultant flux in gaps $G_1$ and $G_3$ increases and in gaps $G_2$ and $G_4$ decreases, thereby producing a net force to the right tending to center the suspended member and reduce the proximiter signal to zero. Note the oppositely flowing triple-dot-dash flux lines of FIG. 2 produced by the oppositely flowing control currents in coils 32, 33. This same magnetic configuration and electronic system can also be used to modulate the flux in the gaps so that the resultant flux in the gaps may be increased non-differentially, thereby increasing the radial stiffness. This radial stiffness augmentation flux is shown by the single-dot-dash flux lines in FIG. 2. Note that the current in the coils 32, 33 must flow in the same directions through the coils so as to produce electromagnetic fluxes flowing in the same direction across all gaps. Consider the fluxes in gaps $G_1$, $G_2$, $G_3$ and $G_4$; the quiescent flux density is $B_0$ and the electromagnetic augmentation flux density $\Delta B$ so that the gap flux densities are:

$G_1 = B_0 + \Delta B$
$G_2 = B_0 - \Delta B$
$G_3 = B_0 - \Delta B$
$G_4 = B_0 + \Delta B$ However, as in equation (3) above:

$$K_{rauy} \alpha \frac{A}{\mu_0}[2(B_0 + \Delta B)^2 + 2(B_0 - \Delta B^2)] \tag{8}$$

or:

$$K_{rauy} \alpha \frac{4A}{\mu_0}[B_0^2 + \Delta B^2] \tag{9}$$

which demonstrates a net increase in radial stiffness.

In FIG. 4, a predetermined fixed augmentation current is supplied to coils 32, 33 when the power to the system is turned on. This current is derived from positive and negative power supplies 110, the negative supply connected to the coil 32, amplifier 102 and the positive to the coil 33, amplifier 103, this polarity providing the proper current direction in the coils compared to the axial stabilization currents. As stated above, the rotor speed-dependent resonances can be predetermined by design and are designed to occur at rotor speeds well below nominal operating rotor speeds. A typical resonance curve is shown in FIG. 5 as peaking at a rotor speed $\omega_A$, $\omega_S$ representing the nominal operating speed. However, since the radial augmentation currents are supplied at turn on (or at some other rotor speed below $\omega_A$ by suitable threshold speed detection means if desired) the change in radial stiffness effectively shifts the resonant peak to a higher frequency $\omega_B$ beyond the nominal operating frequency. Therefore, during run up, the resonant peak $\omega_A$ is avoided so when $\omega_S$ is reached, the radial augmentation power may be shut off and nominal operation initiated. Tachometer 22 is employed to detect the speed of shaft 12, the output of which is applied to a threshold detector 111 which has been set to detect when rotor speed reaches (or just about reaches) $\omega_S$. When the threshold is reached, detector 111 supplies an output to transistor switches 112, 113 for shorting the augmentation power to ground. Obviously, many alternative switching arrangements may be devised for removing the augmentation power. For example, it is possible to switch out the augmentation power on the basis of time, i.e., some known time period required for the rotor to come up to speed. Also, it is possible, if there are a number of known resonances, to apply the augmentation power just before and remove it just after those speeds at which the resonances become objectionable. Further, it is possible to actually detect the resonances, as by a radial proximiter similar to axial proximiter 19 and frequency detection circuits similar to detector 111 responsive thereto, and use its output to switch the augmentation power to thereby avoid the resonant peaks.

In FIG. 6, there is illustrated an alternative embodiment of the present invention which is applicable where large radial and axial disturbance forces are involved. In this embodiment, two magnets, six gaps, and three coils are provided and it is believed clear how the magnet or quiescent fluxes are flowing in the gaps to provide increased radial stiffness and how the electromagnetic fluxes provided by the three coils serve to modulate the quiescent fluxes to provide increased axial stiffness without describing them in detail. In general, the analysis is a simple expansion of the three loop magnetic circuit with two coils to a (2n + 1) loop magnetic circuit with (n + 1) coils.

Figure 7:
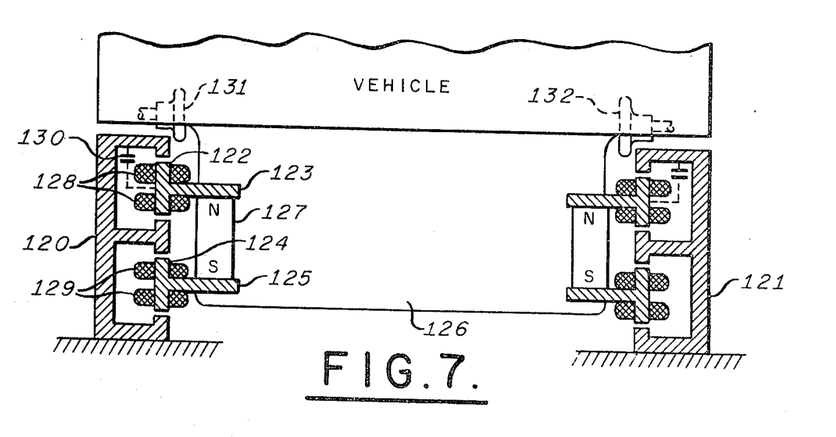
FIG. 7 is a schematic illustration of the magnetic bearing of the present invention as applied to levitating a transit vehicle.

In FIG. 7, there is illustrated a further embodiment of the present invention; its application to levitating a vehicle of, for example, a rapid transit system. As schematically shown, the flat bottomed W-shaped (or E-shaped) magnetically permeable core members 120, 121 corresponding to element 34 of FIG. 2, constitute continuous spaced "rails" and a plurality of cooperating armatures 122, 123 and 124, 125 corresponding to elements 44, 51 and 45, 52, respectively, of FIG. 2 are mounted on the sides of the transit car 126. Magnet (or magnets) 127 and coils 128, 129 corresponding to magnet 31 and coils 32, 33 of FIG. 2 provide energization of the suspension system. The proximiter indicated at 130 corresponds to proximiter 19 of FIG. 1 and serves to control an electronic system carried by the vehicle 126 which in turn controls currents in the coils 128, 129 to maintain the vehicle levitationed against gravity while the quiescent magnetic force provided by magnets 127 maintains the vehicle in position against lateral movements. Back-up wheels 131, 132 may be provided for the same purposes as the back up bearings of FIG. 3.

While the invention has been described in its preferred embodiments, it is to be understood that the words which have been used are words of description rather than limitation and that changes may be made within the purview of the appended claims without departing from the true scope and spirit of the invention in its broader aspects.

I claim:

1. Magnetic suspension apparatus for suspending one member relative to another, one of said members being fixed and the other being movable relative thereto in at least first and second orthogonal, translational directions comprising:

a first magnetically permeable core means carried by one of said members and a second magnetically permeable core means carried by the other of said members, said first and second core means having cooperative pole pieces and so relatively shaped and juxtaposed as to define at least four successive magnetically permeable gaps therebetween adapted to conduct magnetic flux lines of force generally parallel to the first of said translational directions, permanent magnet means carried by one of said core means for producing a constant magnetic flux of one polarity across said first and fourth gaps and of the opposite polarity across said second and third gaps whereby the resultant magnetic forces acting between said core poles tend to oppose relative movement of said members in the second of said translational directions and simultaneously to produce unstable relative movement of said members in the first of said directions, at least a pair of electromagnetic means also carried by said one core means adapted when energized to produce variable magnitude electromagnetic fluxes of one polarity across said first and second gaps and simultaneously of the opposite polarity across said third and fourth gaps, and means responsive to relative movement between said members in said first direction for energizing said electromagnetic means in accordance with such movement whereby to produce resultant magnetic forces between said core poles in a direction and magnitude to reduce said movement in said first direction to zero and thereby stabilize said members in said first direction, each of said pole pieces including a plurality of lands and grooves for concentrating said flux lines across said gaps at said lands and further includes conductive means within said grooves for providing eddy current damping of said relative movement in said second translational direction.

2. Magnetic bearing apparatus for suspending a rotary member for rotation about a reference axis defined by a fixed member comprising:

a first magnetically permeable core means carried by said fixed member and including at least one pair of axially spaced cylindrical core members defining at least four circular pole pieces radially spaced from said axis and each of said cylindrical core members including a radially extending flange portion, a second magnetically permeable core means carried by said rotary member including a cylindrical base core member and at least three core walls extending radially therefrom and terminating in at least four circular pole pieces adjacent to and collinear with the pole pieces of said pair of cylindrical core members, whereby to provide at least four axially successive, circular magnetically permeable gaps adapted to conduct magnetic flux lines of force generally parallel to said reference axis, permanent magnet means coupled between said flange portions of said first core means for producing a fixed magnetic flux of one polarity across the first and fourth of said successive gaps and of the opposite polarity across the second and third of said successive gaps whereby said magnetic flux inherently produces stabilizing forces in the radial direction and oppose relative radial movement of said rotary member relative to said reference axis and simultaneously to produce destabilizing forces in the axial direction from a predetermined neutral force position, at least one pair of annular electric coils, one supported on each of said cylindrical core members and adapted upon energization to produce variable magnitude fluxes of one polarity across said first and second gaps and simultaneously of the opposite polarity across said third and fourth gaps, electrical sensor means coupled between said rotary member and said fixed member for providing a signal proportional relative axial movements thereof from said predetermined neutral force position, and amplifier means responsive to said signal for supplying control currents to said coils of a magnitude and sense to reduce said sensor signal to zero and thereby stabilize said axial magnetic forces, each of said pole pieces including circular lands and grooves for concentrating said flux lines across said gaps at said lands whereby to increase said radial stabilizing forces, and further including closed electrically conductive rings in said grooves for providing eddy current damping of said radial movement between said members.

3. Magnetic suspension apparatus for suspending one member relative to another, one of said members being fixed and the other being movable relative thereto in at least first and second orthogonal, translational directions comprising, a first magnetically permeable core means carried by one of said members and a second magnetically permeable core means carried by the other of said members, said first and second core means having cooperative pole pieces and so relatively shaped and juxtaposed as to define at least four successive magnetically permeable gaps therebetween adapted to conduct magnetic flux lines of force generally parallel to the first of said translational directions, permanent magnet means carried by one of said core means for producing a constant magnetic flux of one polarity across said first and fourth gaps and of the opposite polarity across said second and third gaps whereby the resultant magnetic forces acting between said core poles tend to oppose relative movement of said members in the second of said translational directions and simultaneously to produce unstable relative movement of said members in the first of said directions, at least a pair of electromagnetic means also carried by said one core means adapted when energized to produce variable magnitude electromagnetic fluxes of one polarity across said first and second gaps and simultaneously of the opposite polarity across said third and fourth gaps, means responsive to relative movement between said members in said first direction for energizing said electromagnetic means in accordance with such movement whereby to produce resultant magnetic forces between said core poles in a direction and magnitude to reduce said movement in said first direction to zero and thereby to stabilize said members in said first direction, and mechanical back-up bearing means carried by one of said relatively movable members and spaced from the other of said members in both said translational directions for limiting said relative movement of said movable member upon failure of said magnetic bearing suspension.

* * * * *